(12) United States Patent
Gutierrez et al.

(10) Patent No.: US 8,395,099 B2
(45) Date of Patent: Mar. 12, 2013

(54) METHOD FOR CONTROLLING RESONANT POWER CONVERTERS IN INDUCTION HEATING SYSTEMS, AND INDUCTION HEATING SYSTEM FOR CARRYING OUT SUCH METHOD

(75) Inventors: Diego Neftali Gutierrez, Varese (IT); Carlo Calesella, Castlemassa (IT); Davide Parachini, Cassano Magnago (IT)

(73) Assignee: Whirlpool Corporation, Benton Harbor, MI (US)

( * ) Notice: Subject to any disclaimer, the term of this patent is extended or adjusted under 35 U.S.C. 154(b) by 387 days.

(21) Appl. No.: 12/687,343

(22) Filed: Jan. 14, 2010

(65) Prior Publication Data
US 2010/0181306 A1    Jul. 22, 2010

(30) Foreign Application Priority Data
Jan. 16, 2009    (EP) .................................... 09150695

(51) Int. Cl.
*H05B 6/08*    (2006.01)

(52) U.S. Cl. ...................................................... 219/664
(58) Field of Classification Search .................. 219/608, 219/624, 661–667
See application file for complete search history.

(56) References Cited

U.S. PATENT DOCUMENTS
2001/0036085 A1    11/2001   Narita
2010/0181306 A1*   7/2010    Gutierrez et al. ............. 219/660

FOREIGN PATENT DOCUMENTS
WO    WO 2008/137935    11/2008

* cited by examiner

*Primary Examiner* — Calvin Lee
(74) *Attorney, Agent, or Firm* — Jason S. Burnette; Diederiks & Whitelaw PLC

(57) ABSTRACT

A method for controlling resonant power converters using power transistors, particularly for induction heating systems, comprises a step of assessing the occurrence of non-zero voltage switching or non-zero current switching and a step of adjusting the control accordingly, the assessment of the above occurrence being performed by monitoring at least one electrical parameter correlated to the resonant circuit.

22 Claims, 10 Drawing Sheets

METHOD FOR CONTROLLING RESONANT POWER CONVERTERS IN INDUCTION HEATING SYSTEMS, AND INDUCTION HEATING SYSTEM FOR CARRYING OUT SUCH METHOD

BACKGROUND OF THE INVENTION

1. Field of the Invention

The present disclosure relates to a method for controlling resonant power converters using power transistors, particularly for controlling induction heating systems.

Power converters contain resonant L-C networks whose voltage and current waveforms tend to be quasi sinusoidal and in phase as their frequency approach the resonance frequency.

An advantage of resonant converters is that power semiconductor switching losses are limited even though a high quantity of power is supplied to the load. Several control techniques, like zero current switching (ZCS) or zero voltage switching (ZVS), can be used to reduce power loss in resonant converters.

2. Description of the Related Art

In particular, for induction heating systems used in cooking appliances, particularly in Europe, the most used control technique is ZVS. It is based on the fact that inductive current passes through the antiparallel diode before the effective turn-on of the power transistor, thus eliminating the turn-on.

Zero voltage switching (ZVS) resonant power converters are well known in literature as well as the design criteria of all their main parameters. Among them, an important parameter is the so-called dead time that refers to the time interval between two power transistor turn-on's: it is necessary to establish a certain time interval at which both of them are off in order to avoid power transistor cross-conduction.

In order to simplify design and control of the converters, often the dead-time between two-in-series power transistors is assigned a constant value for all operating conditions, expecting this value will fulfil ZVS/ZCS in all working conditions.

If the control of the power converter applies a fixed dead time for every working condition (i.e. different loads and different requested output powers) and it doesn't adapt it taking into consideration the kind of load, however, it is possible that some configurations of load and requested output power lead to non-ZVS for the power transistors and, consequently, to a loss of efficiency for the power converter and premature power transistor wear-out.

For half-bridge series resonance power converter (a system most used in Europe for induction heating systems) the standard way for controlling the power supplied to the coil is to vary the power transistor drive frequency within a extensive range, typically comprised between 20 KHz and 100 KHz.

A typical example is the half-bridge series resonant converter used as the power system of an induction heating cooktop. The series resonant circuit of this converter consists of a capacitor, an inductor and a resistance. FIG. 1 shows a schematic draft of this kind of topology.

This topology is used to produce a high-frequency electromagnetic field that penetrates the metal of the ferromagnetic material cooking vessel and sets up a circulating loop electric current. That current flows through the resistance of the metallic pan, and generates heat. Therefore, the effective load is the cooking vessel itself. Different vessels have different electrical properties, and also the same vessel has different electrical properties at different temperatures, or when positioned slightly decentralized from the centre of the induction coil. An equivalent circuit of the FIG. 1 resonant circuit is shown in FIG. 2.

The typical switching frequency range of this type of converter is 20÷100 kHz, and the preferred control technique used in induction heating is ZVS, which will be detailed in the following description.

For avoiding cross conduction between the two power transistors that will cause permanent failure of the converter, it is established a fixed dead-time between both pulse-width modulation (PWM) power transistor driving signals. It is expected that load current will flow through the antiparallel diode of opposite power transistor just before next power transistor turn-on, during the dead-time time interval. However, due to the wide range of possible work conditions in terms of different cooking vessel loads and requested output power, it is possible that this situation might not happen always and thus the ZVS conditions are not always fulfilled. An example of this is shown in FIGS. 3a-3d.

FIG. 3a shows three different working situations for a half-bridge series resonant converter which are detailed in FIGS. 3b-3d. In the figures are indicated the Vce collector-emitter voltage at power transistor turn-on, where Vce is equal to the difference between Vdc link and output voltage Vd (FIG. 4). FIG. 3b shows ZVS control mode. FIG. 3c shows non-ZVS power transistor control mode in which the power transistor voltage drop Vce is low. FIG. 3d shows non-ZVS power transistor control mode in which the voltage drop Vce is at maximum.

The three FIGS. 3b-3d show the coil current and coil voltage of the induction coil of the converter (Lr in the schematic diagrams of FIGS. 1 and 2), and the power transistor frequencies actuated for FIGS. 3b, 3c, and 3d are 25 KHz, 23 KHz and 22 KHz, respectively.

FIG. 3b shows almost null Vce so ZVS is fulfilled. Instead FIGS. 3c and 3d show non-ZVS occurrences.

SUMMARY OF THE INVENTION

An aspect of the present disclosure is to avoid the above mentioned problems, particularly with reference to induction heating system used in cooking appliances.

The above aspect is reached thanks to the features listed in the appended claims.

The method according to the disclosure is mainly focused on detecting non-ZVS or non-ZVS occurrences and on re-adapting in real time the parameters of the control circuit in order to guarantee ZVS, regardless the electrical properties of the load.

The preferred parameters to be re-adapted (for recovering ZVS) are dead time and power transistor drive frequency: to change dead time is preferred because it allows the control to still work at the desired frequency while maintaining the requested power.

Even if the present disclosure is focused on the description of a technique to detect non-ZVS occurrences and a method to avoid them by real-time readapting working parameters, preferably dead time, in order to guarantee ZVS of power transistor turn-on in all working conditions, it is considered that the teaching of the present invention can be easily applied to converter that uses ZCS power transistor control mode.

BRIEF DESCRIPTION OF THE DRAWINGS

Further advantages and features of this disclosure will be clear from the following detailed description, with reference to the attached drawings in which:

FIG. 6 shows plot with coil current waveform at non-ZVS power transistor turn-on.

FIG. 7 shows plot with power transistor leg current waveform at non-ZVS power transistor turn-on;

FIG. 8 shows plot with coil voltage waveform at non-ZVS power transistor turn-on;

FIG. 12 is a detail of diagram 11 showing how the occurrence of a non-ZVS transition has a side effect to generate a signal drop before next power transistor turn-on.

DETAILED DESCRIPTION OF THE PREFERRED EMBODIMENTS

Figure 3A:
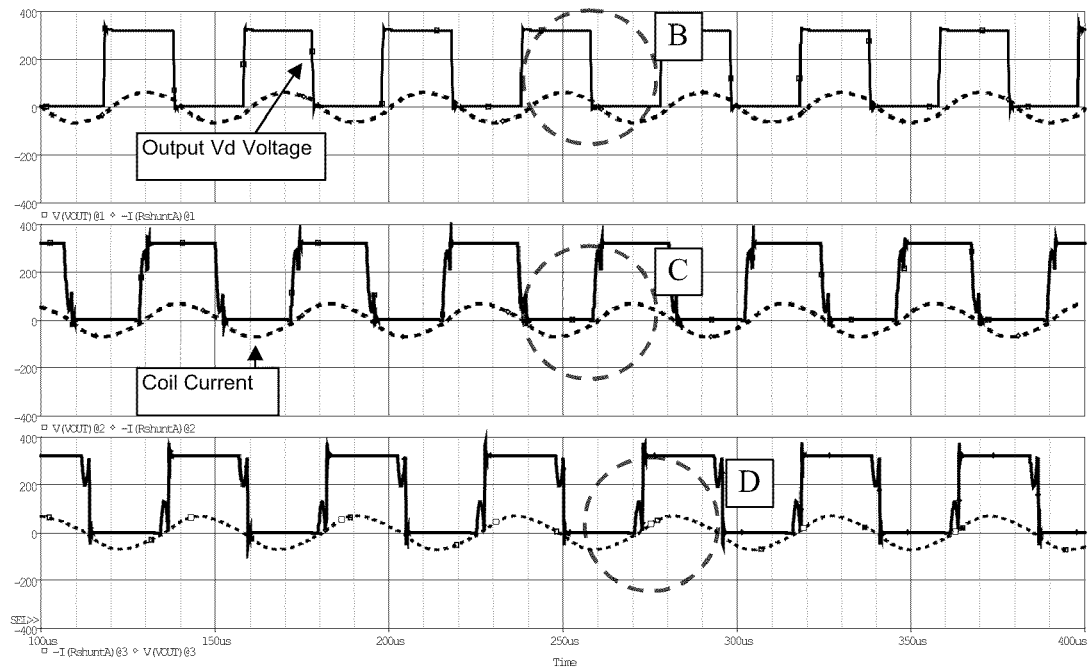
FIGS. 3a, 3b, 3c, 3d show examples of resonant/ZVS power converter showing an electrical parameter (Vd) monitored to detect non-ZVS transitions.
Figure 3B:
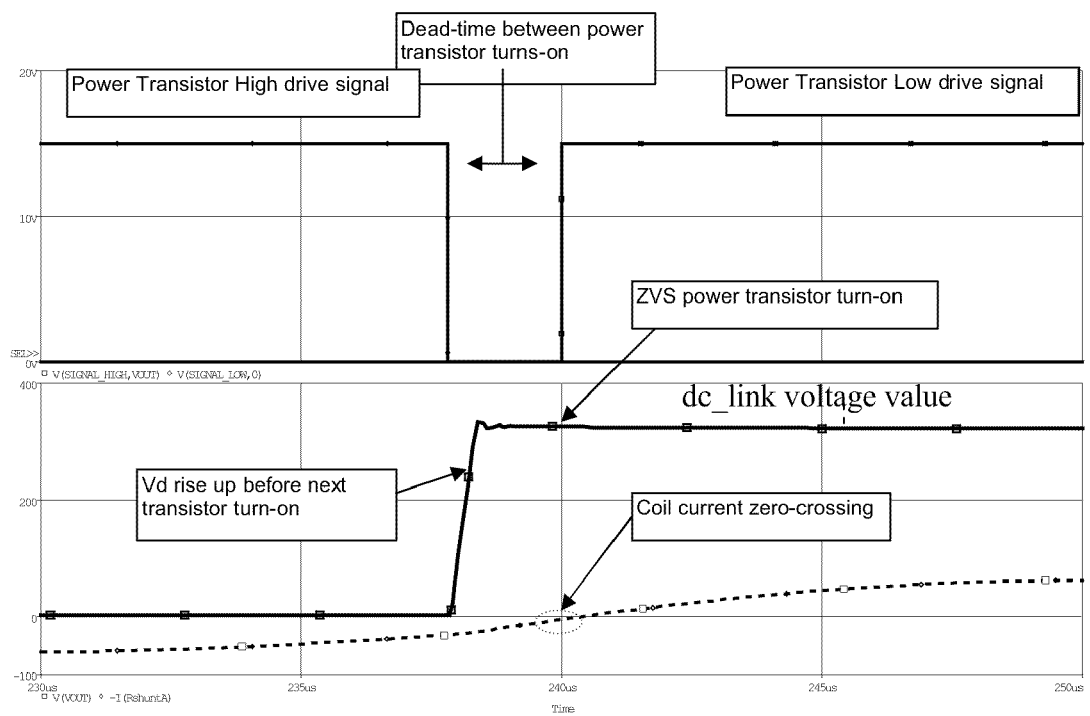
Figure 3C:
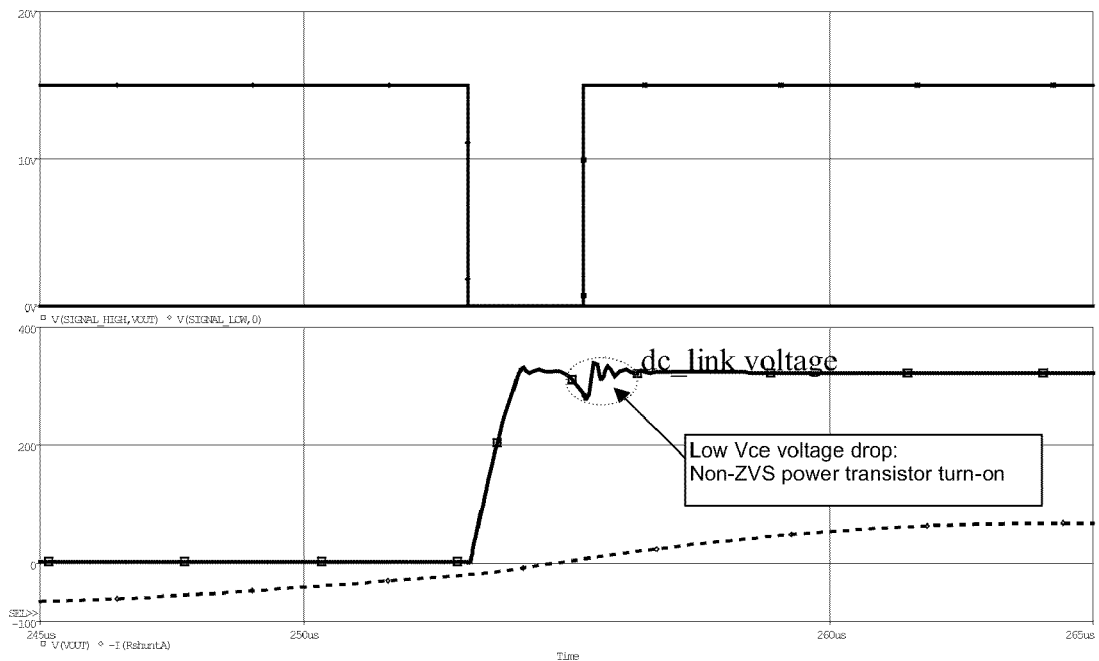
Figure 3D:
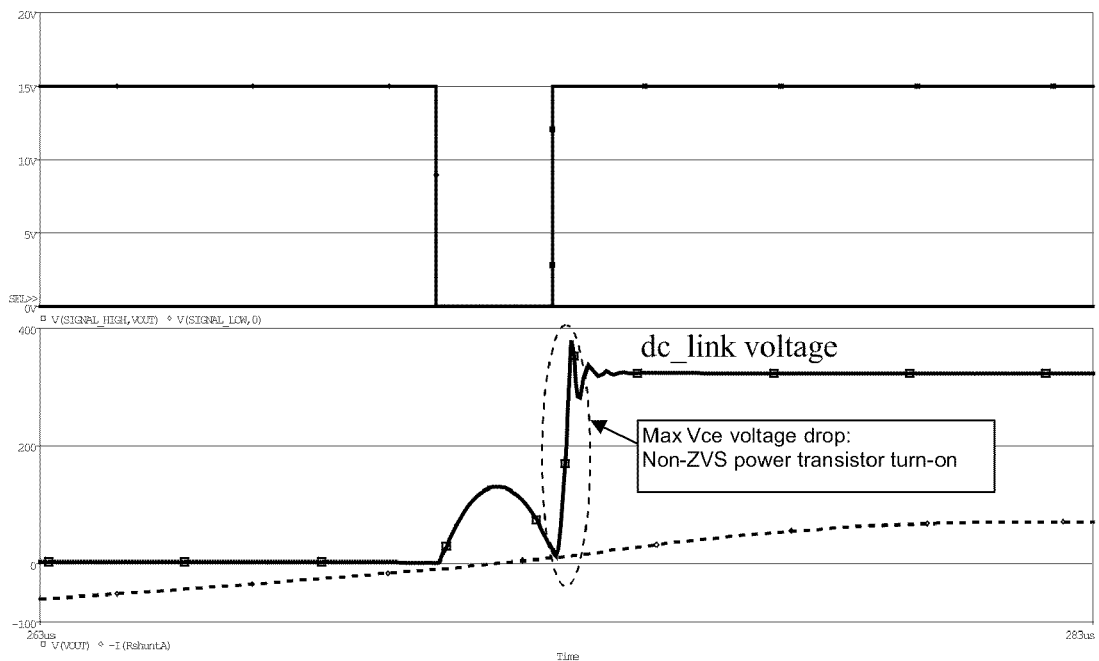
Figure 4:
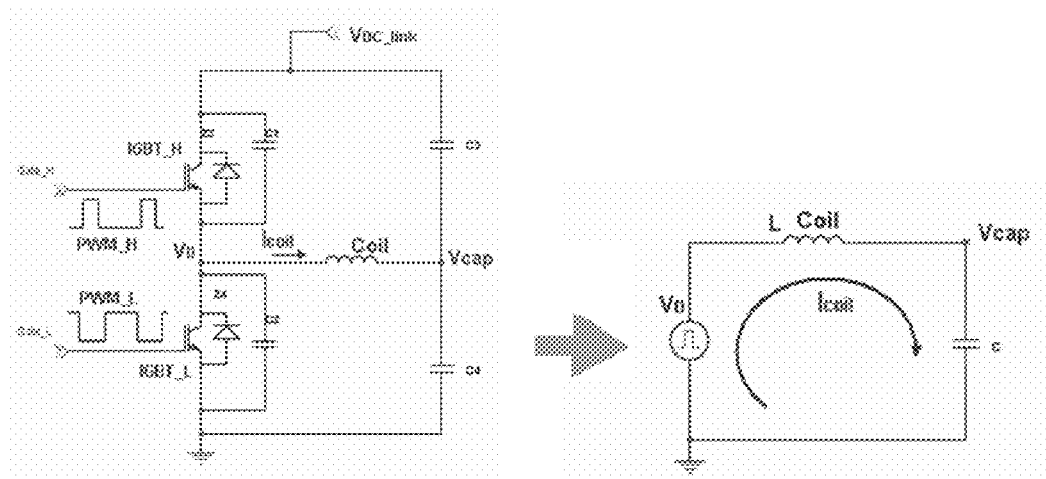
FIG. 4 shows an equivalent electrical circuit where converter output voltage Vd is shown as the input voltage source.

With reference to the drawings, the occurrence of a non-ZVS transition can be detected by monitoring electrical magnitudes that are correlated somehow to output voltage commutated Vd. FIG. 4 shows the simplified schematic circuit of a half-bridge series resonant converter as seen from the output voltage Vd. Thus, sensing directly the output voltage commutated Vd could be a way of detecting non-ZVS. As said before, FIG. 3 shows four plots with non-ZVS and ZVS power transistor turn-on where output voltages of power converter are shown. In FIGS. 3b, 3c and 3d the power transistor drive frequency is 25 KHz, 23 kHz and 22 KHz, respectively. These frequencies aren't quite different from the resonance frequency, hence the coil current is almost in phase with the output voltage Vd (in FIGS. 3c and 3d the coil current will pass zero-crossing during dead time, which means that delay between Vd and coil current is almost zero degrees).

Figure 1:
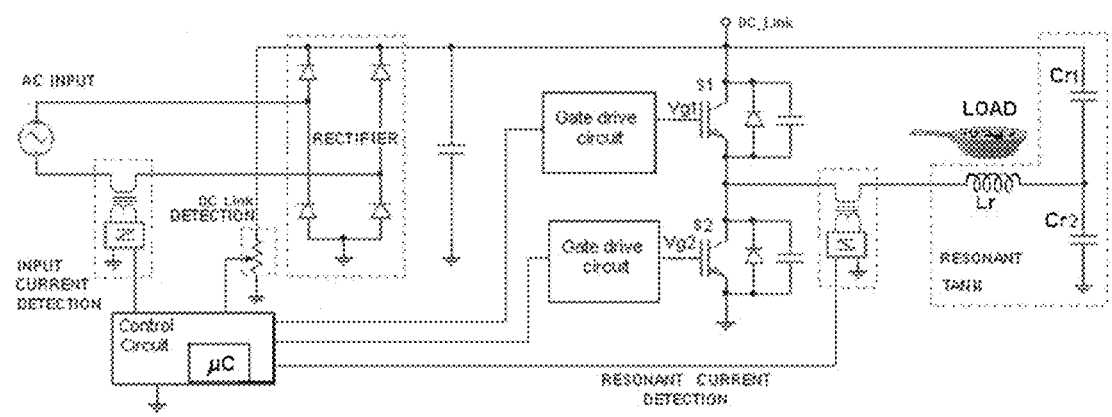
FIG. 1 is an example of resonant converter with half bridge series resonant topology applied to an induction cooktop.
Figure 2:
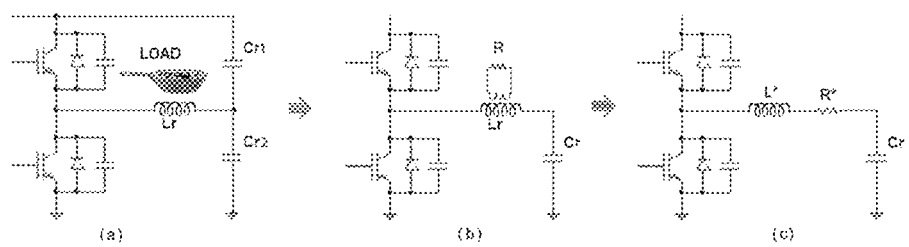
FIG. 2 is an equivalent electric circuit of the resonant circuit of FIG. 1.

In FIG. 3b, when power transistor "High" H (FIG. 4) turns on, the power transistor "Vce" is already close to zero due to the fact that Vd has moved from zero to dc link voltage (ZVS). In other words, the coil current is big enough for charging the snubber capacitor C1 of FIG. 4 (or discharging, depending on the snubber capacitor we are considering in FIG. 1), that is connected across the power transistor collector and emitter, during the dead-time time interval.

Instead, FIGS. 3c and 3d show two non-ZVS occurrences: the power transistor "High" H is turned on even though "Vce" isn't zero. Then the power transistor "High" H "short-circuits" the snubber capacitor C2, not fully discharged, stressing out the power transistor with high current.

In case of FIG. 3c, coil current is big enough for charging completely the snubber capacitor C2, but just before end of dead-time time interval, the coil current passes zero-crossing and Vd decreases again avoiding ZVS at next power transistor "High" H turn on.

FIG. 3d shows the worst condition at all as coil current passes zero-crossing even before charging the snubber capacitor C2 completely. In this case, Vce can be as big as the entire dc link voltage when power transistor "High" H turns on.

As shown in the example, sensing Vd is a way for detecting non-ZVS power transistor turn on: this way non-ZVS can be detected if sensed Vd value at power transistor "High" turn-on time instant is lower of a predefined voltage threshold than power transistor collector voltage, which is equal to the dc_link voltage value.

Today microcontroller used for induction heating (which actuates the PWM power transistor drive signal) can sense the output voltage Vd via a simple voltage divisor, connected to an A/D (analogue/digital) pin micro. This would be an inexpensive solution for non-ZVS turn-on detection.

Figure 5:
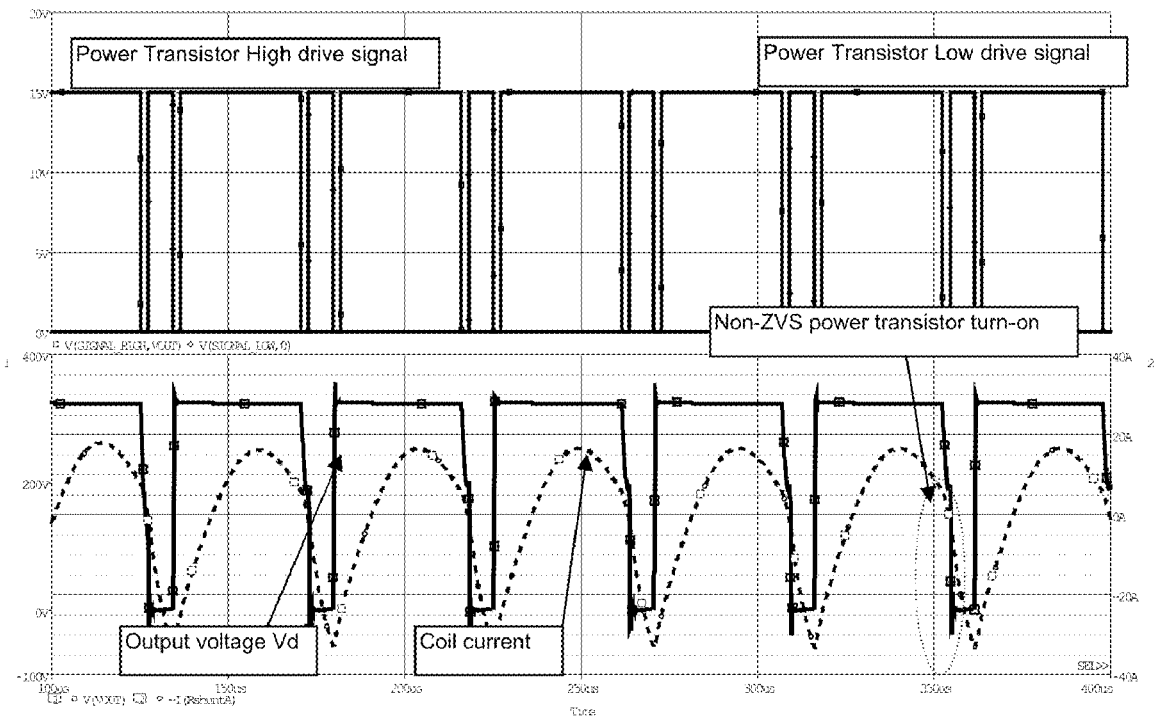
FIG. 5 shows non-ZVS power transistor turn-on at high frequency, far above resonance frequency.

Furthermore, non-ZVS turn-on can occur far from the resonance frequency, at high frequency, where coil inductance is higher than the one at resonance, the coil current is smaller compared to resonance one and lags output voltage Vd of almost 90 degrees). An example of this is shown in FIG. 5.

Figure 6:
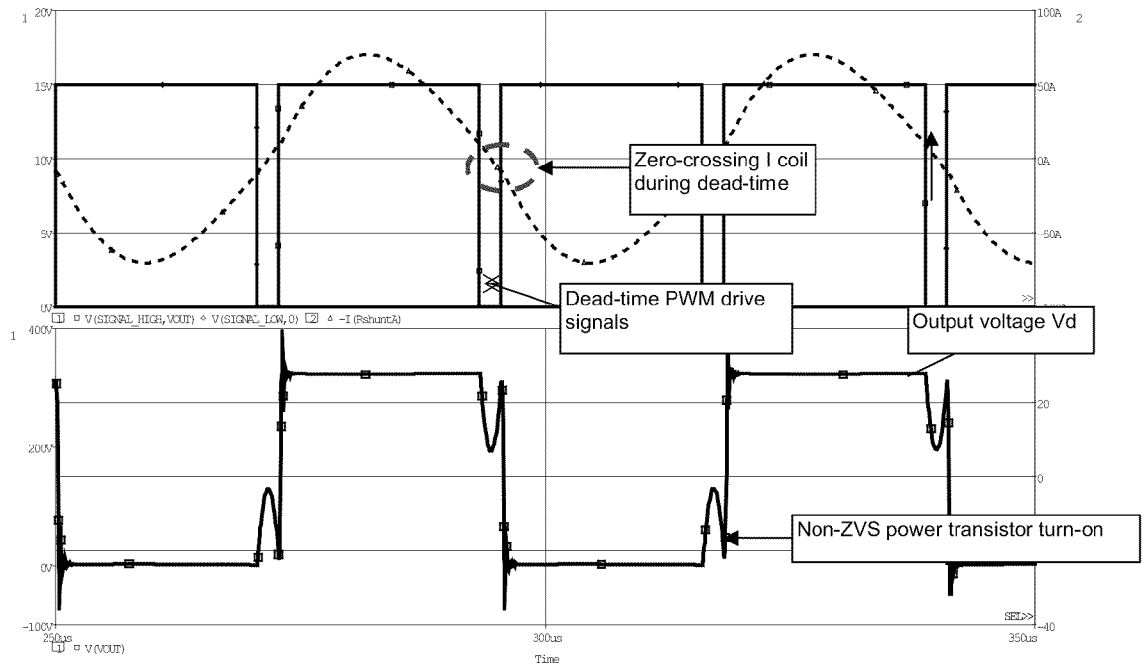

With reference to FIG. 6, another way for detecting a non-ZVS occurrence is to detect the zero-crossing time of the coil current. If it occurs during the dead-time time interval, i.e. after the turn-off of one power transistor and before the turn-on of the other power transistor, then the current wouldn't flow through the antiparallel diode of the second power transistor and the snubber capacitor wouldn't be charged completely avoiding the ZVS power transistor turn-on.

Most of power converters for induction heating measure directly the current of the coil using, for example, current transformer. The microcontroller that receives the signal from the sensor can detect the coil current zero-crossing and verify if this happens within the dead-time time interval.

Figure 7:
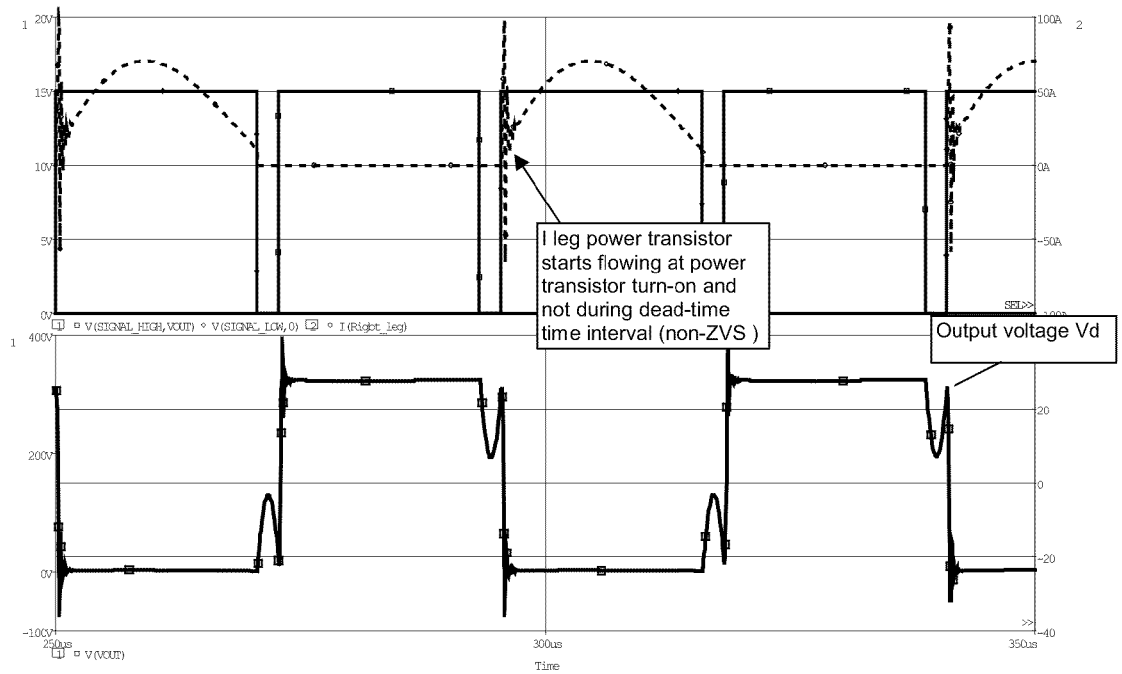

With reference to FIG. 7, another way for detecting a non-ZVS occurrence is to analyze the waveform of one of the two power transistor leg current. In ZVS the leg current of power transistor starts flowing before the power transistor turns on, as it flows through the antiparallel diode of the power transistor. In case of non-ZVS it flows through contemporarily with the power transistor turn-on. FIG. 7 shows an example of non-ZVS.

Figure 8:
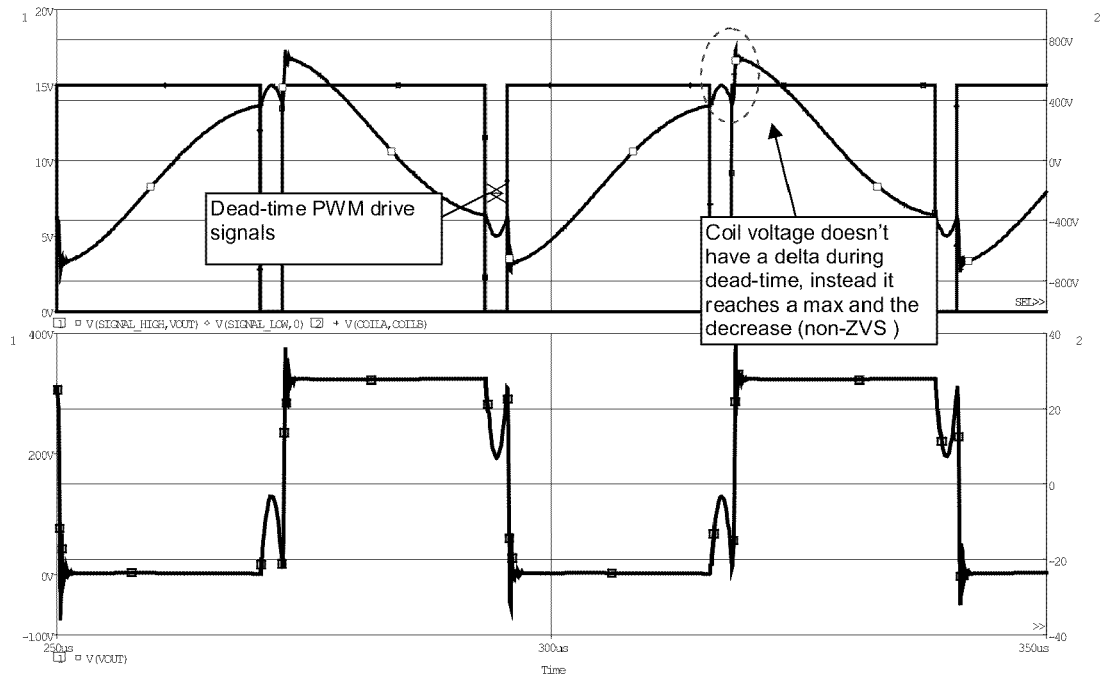

With reference to FIG. 8, another way for detecting a non-ZVS occurrence is to analyze the coil voltage waveform. In case of ZVS the coil voltage has a sharp voltage variation (increase or decrease) equal to dc link voltage at power transistor turn-off and then it changes smoothly together with the coil current. In non-ZVS the coil voltage doesn't have a voltage variation as big as with ZVS case, instead it may reach a maximum and decrease within the dead-time time interval, as seen in the marked area in FIG. 8 (or it may reach a minimum and increases its value, depending on which power transistor was on before). Thus, a microcontroller that measures the coil voltage signals can detect straightforward the non-ZVS occurrence if the voltage signal variation changes its sign during the dead-time time interval.

Figure 9:
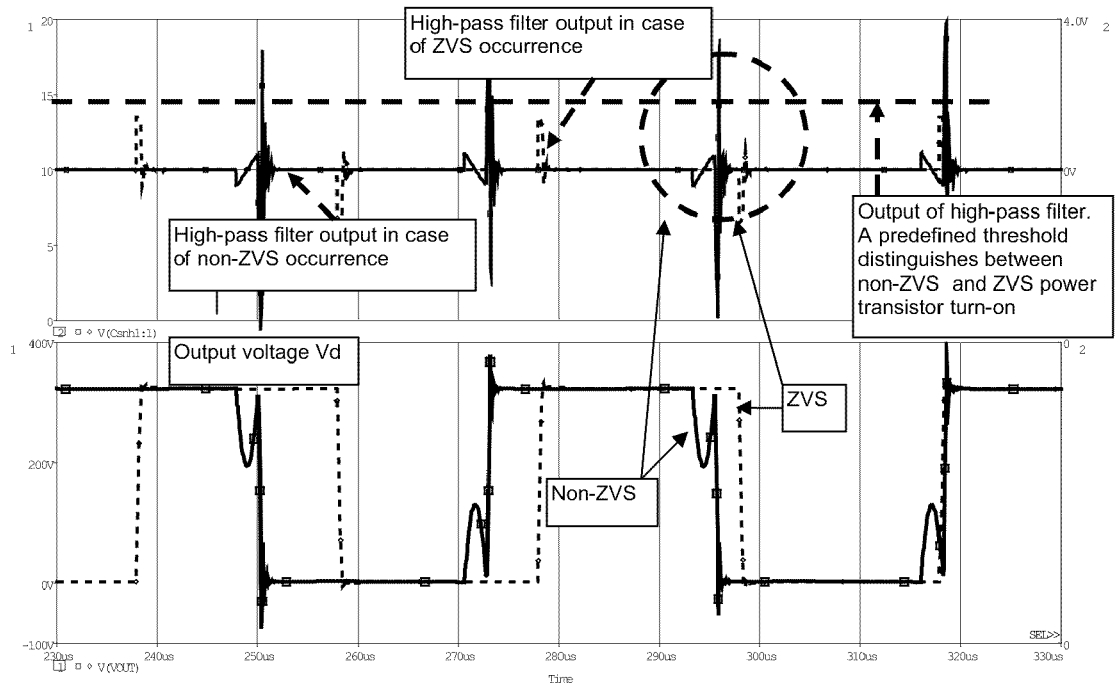
FIG. 9 shows plot with output of high-pass filter applied to output voltage Vd at non-ZVS and ZVS power transistor turn-on's.

With reference to FIG. 9, another way for detecting a non-ZVS occurrence is to apply a high-pass filter circuit to the output voltage Vd (this added hardware is not shown in FIG. 4). This filter will be sensible to sudden variation of the output voltage Vd, as it happens at non-ZVS power transistor turn on. In FIG. 9 the filter output signal of a non-ZVS and ZVS occurrences are shown. The high-pass filter circuit is inexpensive and may be built just with a capacitor and resistance connected in series, whose signals goes directly to the A/D pin micro.

Figure 10:
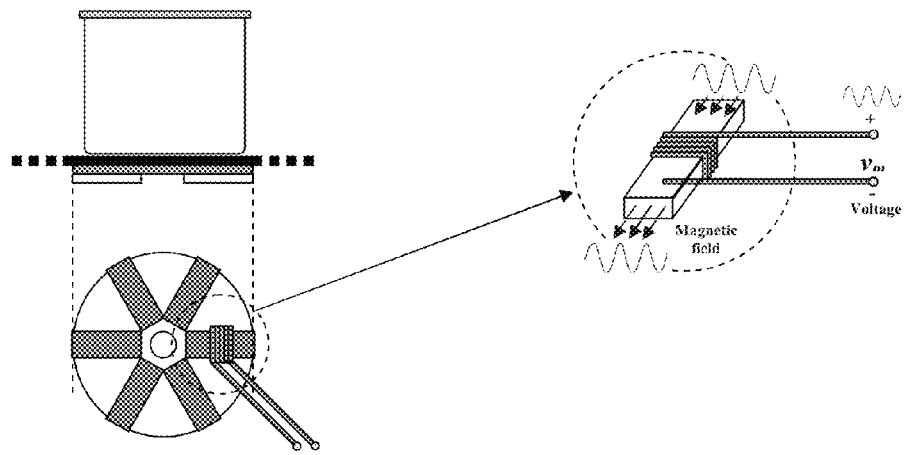
FIG. 10 shows schematically a measurement system for detecting the magnetic flux generated by the coil current as driving parameter for detecting non-ZVS.

With reference to FIG. 10, instead of sensing directly the coil voltage, it is possible to sense the magnetic flux that is concentrated by the ferrite bars. Instead of using ferrite bars, similar devices for shielding and/or concentrating magnetic field can be used as well. It can be easily sensed by adding a conductive wire wrapped around the ferrite bars, commonly applied under the induction coils to concentrate the magnetic flux, as shown in FIG. 10. Ferrites are well known non-conductive ferromagnetic ceramic compounds derived from iron oxides such as hematite or magnetite as well as oxides of other metals.

The voltage $v_m$ induced on the wire is proportional to the magnetic field linked to the ferrite bar, this magnetic field is part of the magnetic field generated by coil current, so $v_m$ is correlated with $v_{coil}$, as shown below:

$$\begin{cases} V_{coil} = -\frac{d\Phi_{coil}}{dt} = -L * \frac{di_{coil}}{dt} \\ \Phi_{ferrites} = f(\Phi_{coil}) \\ V_m = -N\frac{d\Phi_{ferrite}}{dt} \cong -N'\frac{d\Phi_{coil}}{dt} \to N, N': cte \\ Vm = f(Vcoil) \end{cases}$$

Even if the use of a sensor associated to a magnetic field concentrator is preferred, nevertheless a simple coil (or several turns of conductive wire wrapped as a coil) affected by the magnetic field changes can be used as a sensor as well.

Figure 11:
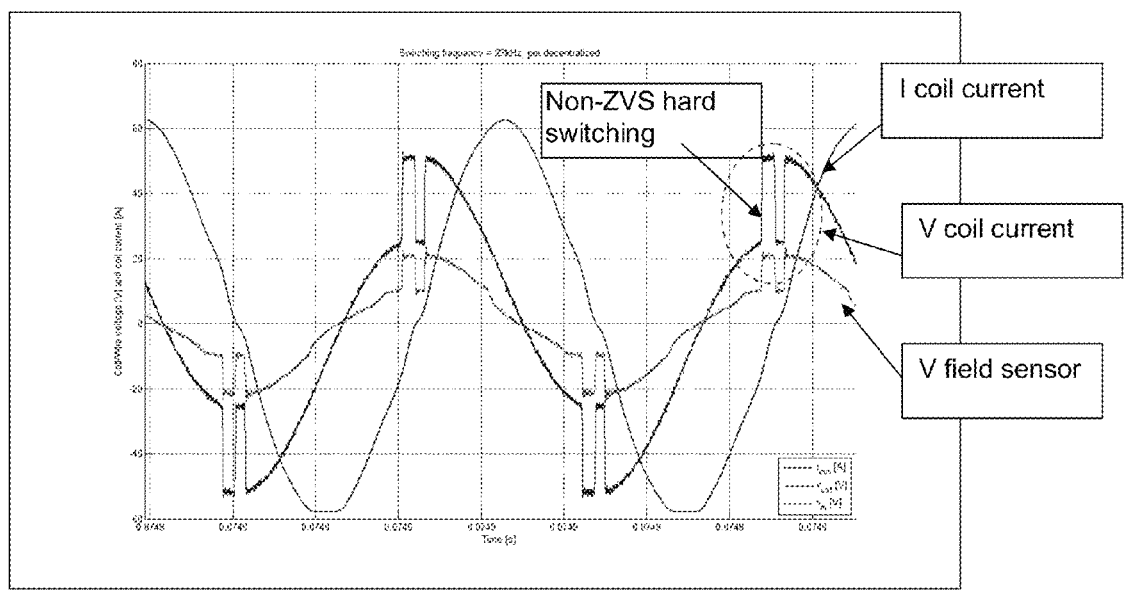
FIG. 11 is a diagram showing the relationship between the coil voltage and the voltage induced by the magnetic flux and detected with the system according to FIG. 10.

FIG. 11 shows a real test where the coil current $v_{coil}$ and the voltage $v_m$ induced by the magnetic flux are measured simultaneously. The plot demonstrates the correlation between $v_{coil}$ and $v_m$.

Figure 12:
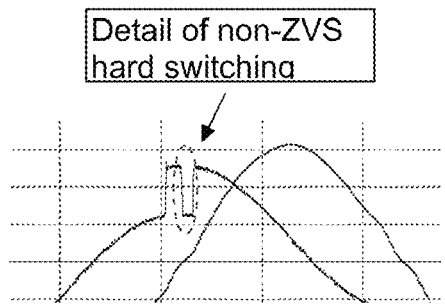

The occurrence of a non-ZVS transition has the effect to generate a sharp voltage variation after a power transistor turn-off and before next power transistor turn-on, as shown in FIG. 12.

In this case non-ZVS occurrences can be detected by measuring the sharp variation of voltage module of sensor output voltage meanwhile both PWM signal are off (during dead-time interval).

Dead-time values should be of the order of some microseconds, the dead-time depending on the characteristic of the power transistor, the power transistor drivers and the working range of PWM frequency that has to be used. Therefore dead-time values are fixed during the design of the induction heating system. As seen before, the variation of these elements can be so large that the dead-time might become too large for guaranteeing the ZVS control mode in all situations. So far a method for detecting non-ZVS commutation has been described.

Once non-ZVS has been detected, there are two ways for recovering ZVS work conditions: to readapt the dead-time by reducing it with small steps or to increase the drive frequency in order to move away from the resonance conditions.

As already said, the first alternative is the preferred one because it allows the control to still working at the desired frequency maintaining the requested power. The second alternative would be operated whenever the dead-time readapting is just not enough for avoiding non-ZVS. Of course, it is not needed to readapt the dead-time continuously, but only when a non-ZVS occurrence is detected.

An example of a method for real-time dead-time readapting is given in FIGS. 13a to 13d. There the nominal value for the dead-time is 2.2 useconds and the frequency range of PWM power transistor is between 20 KHz and 50 KHz. As explained before, during normal cooking process the more the induction pot is getting hot, the more PWM drive frequency should be reduced for guaranteeing a constant power supply. In case the induction cooktop is supplied a power close to the nominal, the actual PWM drive frequency gets closer to the resonance and, thus, coil current phase delay against output voltage Vd is reduced towards zero. That's the main cause that coil current zero crossing occurs during the dead-time time interval. In the example of FIGS. 13a-13d the output voltage Vd is used as the signal for detecting non-ZVS occurrences.

Figure 13A:
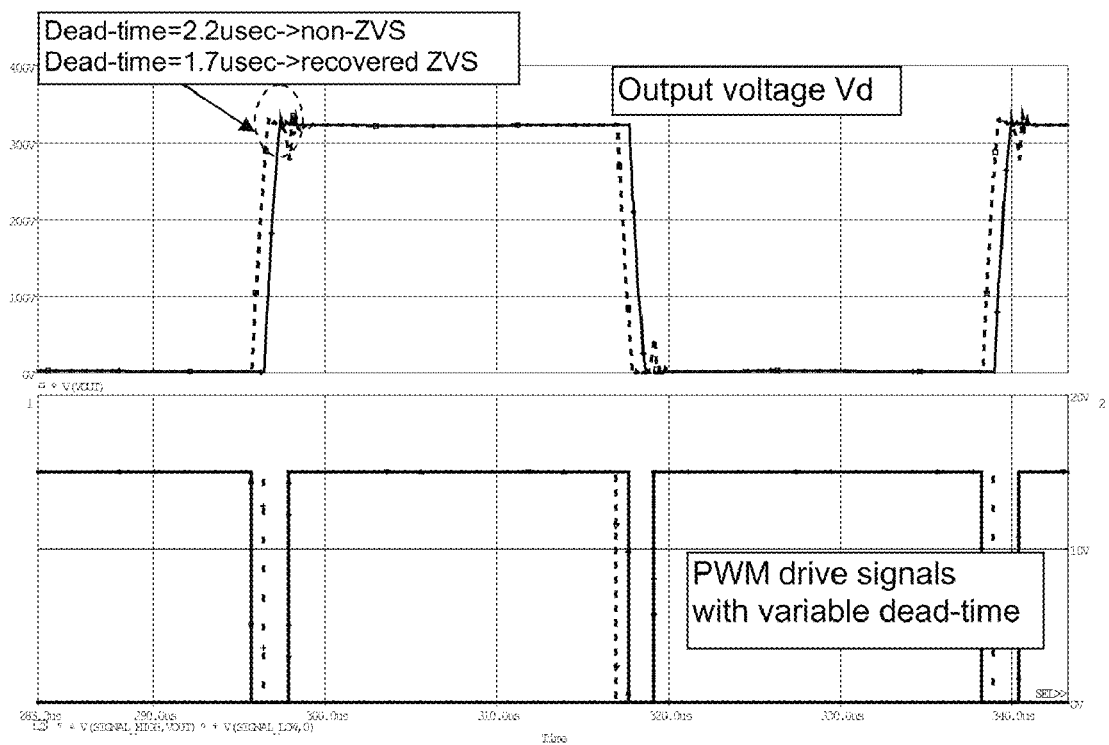
FIGS. 13a, 13b, 13c and 13d show four plots with example of the method of readapting real time dead-time for recovering ZVS or (in some case) finding optimal dead-time value for reducing power transistor stress.
Figure 13B:
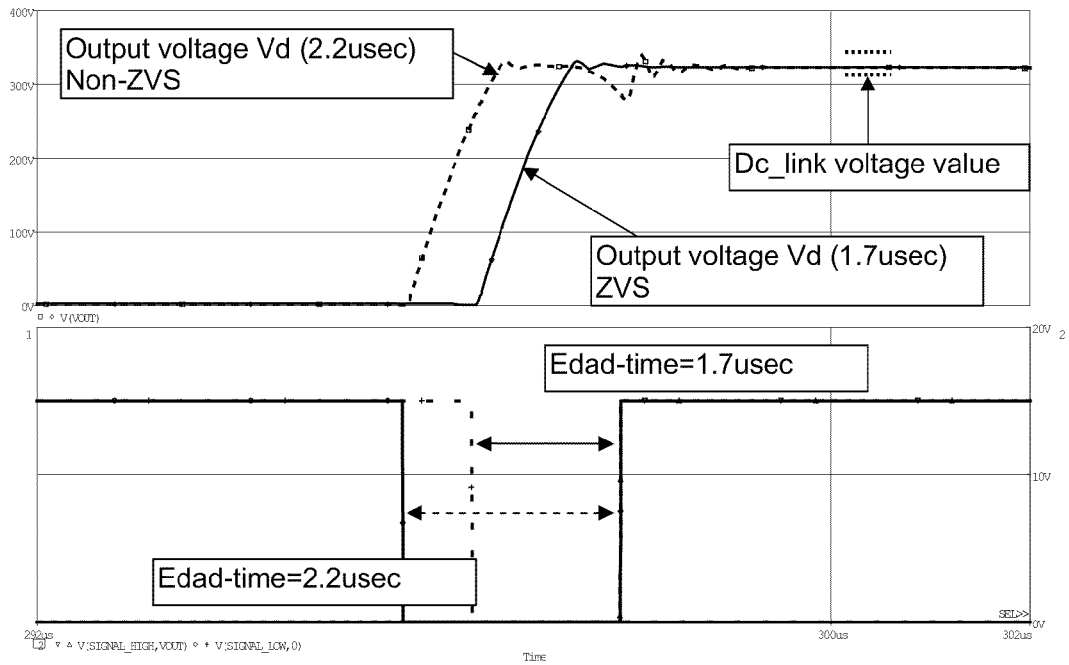

In FIG. 13a the PWM drive frequency is 23.5 KHz and two cases are shown: one with dead-time of 2.2 u seconds (nominal-starting value) and another with 1.7 u seconds. In case of 2.2 u seconds dead-time, output voltage Vd reaches dc link voltage value and then (when coil current passes zero crossing) output voltage Vd starts decreasing its value and, at the moment next power transistor turns on, its voltage value is around 50 V below dc link voltage. Then the control reduces the dead-time with predefined steps so as to limit the Vice (50 V) at turn-on: in the example given, a dead-time of 1.7 u seconds is enough for recovering completely the ZVS conditions.

Figure 13C:
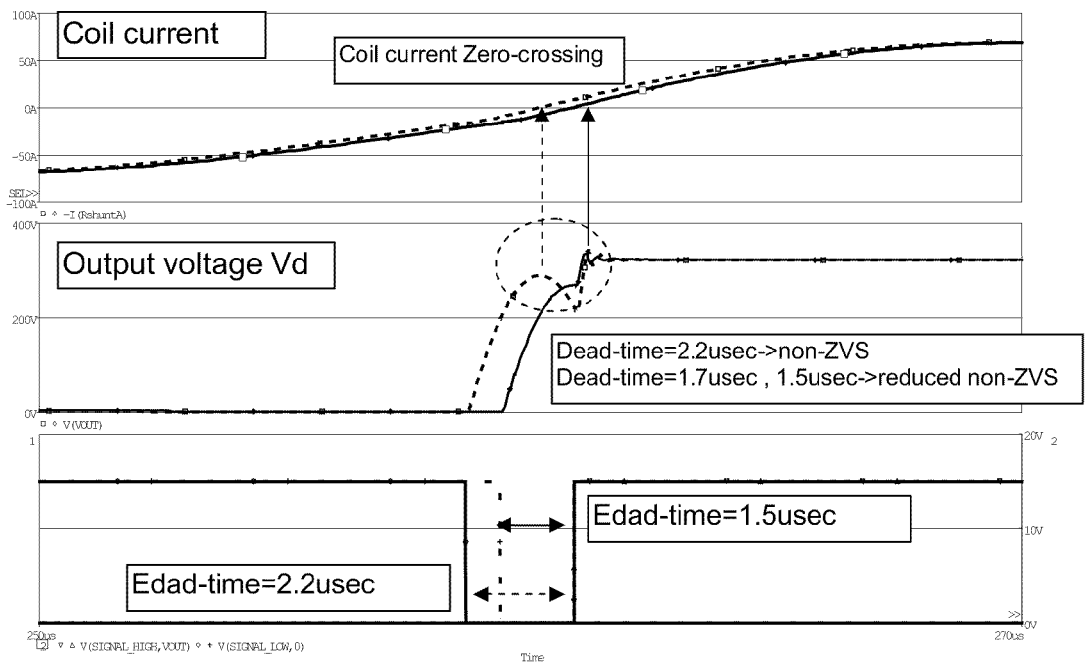
Figure 13D:
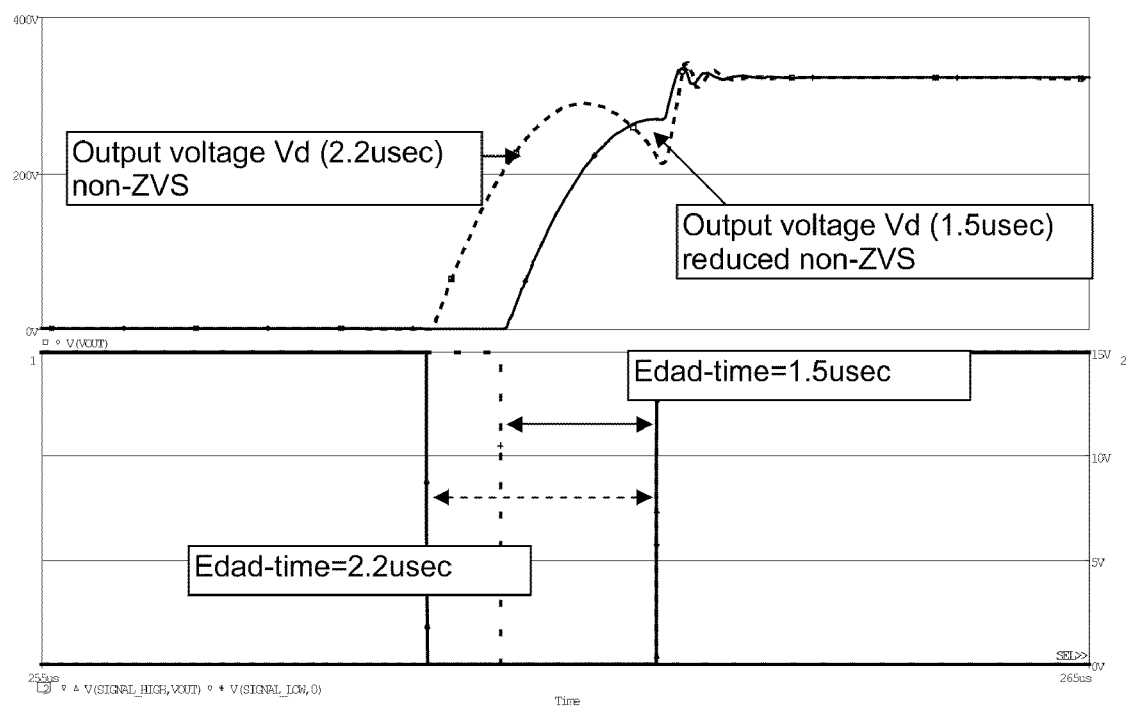

In FIG. 13c it is shown a case where ZVS cannot be recovered completely but reduced as maximum as possible (PWM drive frequency is 23 KHz). This happen because coil current is never enough for charging completely the snubber capacitor during dead-time time interval, in this case the optimal situation would be that dead-time time interval ends when the coil current passes zero-crossing (in other words, a ZCS power transistor turn-on) and the power transistor Vce is reduced to the greatest extent as possible at next power transistor turn-on. As shown in FIG. 3d, this happen when dead-time is reduced from 2.2 u seconds down to 1.5 u seconds. In this case, to reduce further the dead time wouldn't help reducing the power transistor stress, and this method finds the optimal dead time value given this PWM drive frequency.

Nevertheless, if the decrease of Vce might not be enough for ensuring the reliable functioning of the power transistor, the only solution would be to increase the PWM drive frequency (getting away from resonance) and start over with control of the dead time time interval (at the nominal value of 2.2 u seconds).

The method of real-time readapting the dead-time time intervals, as explained above, doesn't vary the output power supply to the load and can be applied independently on the closed-loop supply power control that runs simultaneously in the induction cooktops.

The method according to the invention can be implemented easily, since standard microcontrollers used to control power transistors operations have built-in capability to update the dead-time delays of PWM on the fly and without breaking PWM activities. Therefore, the method can be implemented with a simple software update, granting the maximum efficiency for the converter and the longest life-time for the power transistors.

The above description has presented a method to detect and avoid non-ZVS output voltage power transistors commutations, a potential risk for resonant power converters working with a wide range of different loads and requested output powers.

Non-ZVS power transistor turn-on causes the loss of one of the main benefits of the ZVS topologies, i.e. the minimization of switching losses. The occurrence of hard switching transitions causes a lack of efficiency for the converter and a higher stress for the power transistors, reducing their performances and their useful life-time.

Moreover, if the electrical parameter used for the detection method is already measured by the system, no hardware change to existing topologies is required at all, and the method can be implemented with a simple and inexpensive software update.

This readapting of dead-time will be useful for those controls that use variable duty cycle for varying the power supply to the load, and for those controls which need to work close to at least one resonance frequency point where output coil and voltage are at maximum values and almost in phase between them.

Even if the disclosed method is based on two subsequent steps, i.e. a first step in which a non-ZVS occurrence is detected, and then a second step in which dead-time (or other parameters) is updated in order to avoid non-ZVS occurrences in later switching cycles, nevertheless another implementation of the method could predict non-ZVS occurrences by knowing the dynamics of the induction heating system, and hence it could be able to prevent non-ZVS occurrences by safely readapting the dead-time before the old dead-time value (or the value of another parameter) becomes inappropriate. It is clear that also this variant of the method (in which estimated values are used instead of measured values) is comprised within the scope of the invention.

The invention claimed is:

1. A method for controlling a resonant power converter using power transistors in an induction heating system comprising:
    assessing an occurrence of non-zero voltage switching or non-zero current switching, including predicting the occurrence of non-zero voltage switching or non-zero current switching from dynamics of the induction heating system; and
    adjusting a control feature for the resonant power converter to avoid non-zero voltage switching or non-zero current switching work conditions.

2. The method according to claim 1, wherein adjusting the control feature comprises the real-time readapting of dead-time delays of the power transistors.

3. The method according to claim 1, wherein adjusting the control feature comprises a change of drive frequency in order to move away from resonance conditions.

4. A method for controlling a resonant power converter using power transistors in an induction heating system comprising:
    assessing an occurrence of non-zero voltage switching or non-zero current switching, including monitoring at least one electrical parameter correlated to a resonant circuit of the resonant power converter; and
    adjusting a control feature for the resonant power converter based on the occurrence of non-zero voltage switching or non-zero current switching.

5. The method according to claim 4, wherein the electrical parameter is an output voltage of the resonant circuit.

6. The method according to claim 5, wherein a coil voltage waveform is analyzed.

7. The method according to claim 4, wherein the electrical parameter is a leg current of the at least one of the power transistors of the resonant circuit.

8. The method according to claim 7, wherein a waveform of the leg current of the at least one of the power transistors is analyzed.

9. The method according to claim 4, wherein the electrical parameter is a magnetic field generated by the induction heating system.

10. The method according to claim 9, wherein the magnetic field, is assessed by measuring a current through a coil associated with a ferrite element of the induction heating system.

11. The method according to claim 4, further comprising: applying a high-pass filter circuit to an output voltage of the resonant power circuit.

12. The method according to claim 4, wherein adjusting the control feature comprises a real-time readapting of dead-time delays of the power transistors.

13. The method according to claim 4, wherein adjusting the control feature comprises a change of drive frequency in order to move away from resonance conditions.

14. The method according to claim 4, further comprising: using a current, induced in a wire provided in a magnetic field concentrator of a coil magnetic shield by a magnetic field generated by an induction coil of the induction heating system, as a parameter for detecting the non-zero voltage switching or non-zero current switching.

15. An induction heating system for a cooking appliance comprising:
    induction coils;
    at least one sensing unit for determining dynamics of the induction heating system; and
    a control unit with power transistors for driving the induction coils, wherein the control unit is adapted to predict an occurrence of non-zero voltage switching or non-zero current switching from the dynamics of the induction heating system.

16. The induction heating system according to claim 15, wherein the control unit is configured to adjust by a real-time readapting of dead-time delays of the power transistors.

17. The induction heating system according to claim 15, wherein the control unit is configured to adjust through a change of drive frequency in order to move away from resonance conditions.

18. An induction heating system for a cooking appliance comprising:
    induction coils; and
    at least one sensor for monitoring at least one electrical parameter correlated to a resonant circuit of a resonant power converter of the induction heating system; and
    a control unit with power transistors for driving the induction coils, wherein the control unit is adapted to assess an occurrence of non-zero voltage switching or non-zero current switching and to adjust the control unit based on the occurrence of non-zero voltage switching or non-zero current switching.

19. The induction heating system according to claim 18, further comprising: a coil magnetic shield with magnetic field concentrators, characterized in that at least one of the magnetic field concentrators is provided with a coil wire in which a current is induced by a magnetic field generated by a respective one of the induction coils, the current being used as a parameter for detecting the non-zero voltage switching or non-zero current switching of the control unit.

20. The induction heating system according to claim 19, wherein the magnetic field concentrators constitute ferrite bars.

21. The induction heating system according to claim 18, wherein the control unit is configured to adjust by a real-time readapting of dead-time delays of the power transistors.

22. The induction heating system according to claim 18, wherein the control unit is configured to adjust through a change of drive frequency in order to move away from resonance conditions.

* * * * *